United States Patent
Andersson

(10) Patent No.: US 6,656,031 B1
(45) Date of Patent: Dec. 2, 2003

(54) METHOD AND AN APPARATUS FOR REMOVING THE SKIN FROM A SAUSAGE

(75) Inventor: Ulf Andersson, Halmstad (SE)

(73) Assignee: CFS Kempten GmbH, Kempten (DE)

( * ) Notice: Subject to any disclaimer, the term of this patent is extended or adjusted under 35 U.S.C. 154(b) by 0 days.

(21) Appl. No.: 09/868,852

(22) PCT Filed: Dec. 8, 1999

(86) PCT No.: PCT/SE99/02296

§ 371 (c)(1),
(2), (4) Date: Jun. 21, 2001

(87) PCT Pub. No.: WO00/36922

PCT Pub. Date: Jun. 29, 2000

(30) Foreign Application Priority Data

Dec. 22, 1998 (SE) ............................................. 9804554

(51) Int. Cl.[7] ............................................... A22C 11/00
(52) U.S. Cl. ........................................... 452/50; 452/31
(58) Field of Search .............................. 452/50, 35, 31, 452/32

(56) References Cited

U.S. PATENT DOCUMENTS

| | | | |
|---|---|---|---|
| 4,222,150 A | 9/1980 | Andersen | 17/1 |
| 4,637,095 A | 1/1987 | Maruska | 17/49 |
| 4,682,387 A | 7/1987 | Leining | 17/49 |
| 5,928,073 A | 7/1999 | Andersson et al. | |

FOREIGN PATENT DOCUMENTS

| | | | |
|---|---|---|---|
| EP | 509477 A1 * | 4/1992 | ........... A22C/11/00 |
| EP | 0 509 477 A1 | 10/1992 | |
| EP | 0 732 054 | 3/1996 | |
| EP | 0 721 738 | 7/1996 | |
| SE | 433 032 | 5/1984 | |
| SE | 9404242-1 * | 12/1994 | .................. 452/50 |
| WO | WO 96/17522 | 6/1996 | |

* cited by examiner

Primary Examiner—Charles T. Jordan
Assistant Examiner—Susan C. Alimenti
(74) Attorney, Agent, or Firm—Smith, Gambrell & Russell

(57) ABSTRACT

A method of removing the skin (7) from a sausage (1) comprises a plurality of steps. First, an end portion (2) of the sausage (1) is cut off, whereafter the skin (7) is grasped by gripping means (3) in diametrically opposed positions. Thereafter, an incision is made in the sausage (1) in its longitudinal direction by a knife (6), and the gripping means (3) and the sausage (1) are displaced in relation to one another in the longitudinal direction of the sausage (1) so that the skin (7) is pulled off in this direction. An abutment member (5) counteracts the tendency of the sausage (1) to move with the gripping means (3) when these are displaced. An apparatus for removing the skin (7) from a sausage includes a substrate for supporting the sausage, gripping means (3), a knife (6) and a displacement device (8). The gripping means (3) are disposed on either side of the sausage (1) and the knife (6) is disposed at the surface of the sausage (1) between them.

24 Claims, 6 Drawing Sheets

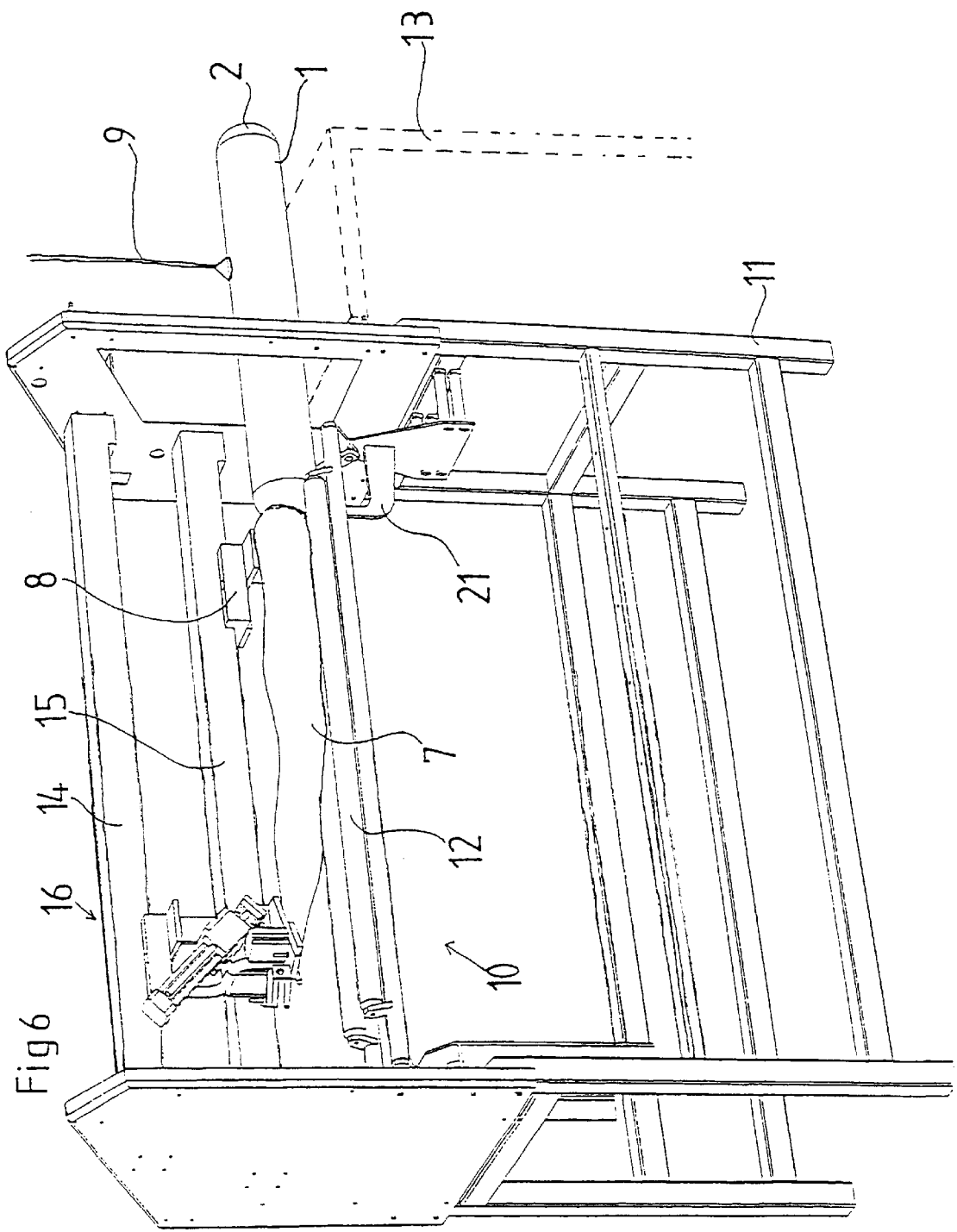

METHOD AND AN APPARATUS FOR REMOVING THE SKIN FROM A SAUSAGE

TECHNICAL FIELD

The present invention relates to a method for removing the skin from a sausage and comprises the steps that an end portion of the sausage is cut off, that the skin is grasped by gripping means, that an incision is made in the sausage by a knife, that the gripping means and the sausage undergo a relative displacement in the longitudinal direction of the sausage and that the skin is pulled off in the longitudinal direction.

The present invention also relates to an apparatus for removing the skin from a sausage.

BACKGROUND ART

Patent specification SE 433 032 discloses a machine for removing skin from sausages which are interconnected to one another in a string. First, the sausages pass through a steam pipe to loosen the skin. Thereafter, the sausages are led up to a pair of feeder rollers in order subsequently to be cut from above by a knife blade edge. The skin is pulled off in that the sausages pass over a perforated suction roller or a vacuum wheel.

One of the drawbacks inherent in this apparatus is that the skin of the sausage, and thereby the subjacent surface, is heated to a relatively elevated temperature, which is not always desirable, among other things for reasons of shelf life. Another drawback is that a perforated suction roller is operationally unreliable since the perforations may readily become blocked by skin slivers or parts from the sausages. Furthermore, it would probably be difficult to clean the suction roller without the machine having to be partly dismantled. Finally, the method is likely to be difficult to employ for sausages which are not connected into a string.

EP 0 721 738 discloses an apparatus and a method for removing the skin from sausages and the like. Initially, the skin is severed in the end portion. A gripping device is moved in inside the edge of the skin and clamps this fast against a frame. Thereafter, the skinning unit, on which the gripping device and the frame are disposed, is moved towards the opposite end of the sausage, the skin being pulled off axially. The risk that the skin becomes folded or otherwise crumpled together is quite large, in particular when long sausages are involved. As a result, there is a quite serious risk of operational stoppage.

EP 0 732 054 discloses a method which is based on the principle that a sausage is provided with two curved incisions along each respective side of the sausage. Thereafter, the upper half of the sausage skin is pulled off, followed by the lower half. The two halves are connected together in the one end of the sausage, but the risk would appear to be quite large that the skin breaks or ruptures in the connection between the upper and the lower half, with consequential operational stoppage.

EP 0 509 477 shows how the skin may be removed from a sausage in that a knife cuts a longitudinal incision on the upper side of the sausage. The skin is grasped on each respective side of the incision with the aid of two suctions strips or beads. The suction strips are disposed on two arms which are pivoted outwards and thereby entrain the skin with them. The drawbacks inherent in a construction according to this Patent Specification are that the use of suction devices so close to the incision entails risks that only a part of the skin will be pulled off, and/or that the suction devices fasten in the sausage inside the incision.

PROBLEM STRUCTURE

The present invention has for its object to formulate the method intimated by way of introduction such that it may, with great operational reliability and rapidity, be employed for removing the skin from a sausage regardless of the appearance of the end portion of the sausage and regardless of whether there may be metal parts or the like disposed at the end portion of the sausage. Furthermore, the outside of the skin and any matter which has been in contact with it may not come into contact with the skinned sausage.

The present invention further has for its object to realize an apparatus for removing the skin from a sausage. Thus, the present invention relates to an apparatus which is easy to operate, which is extremely reliable in operation, which is flexible and which may therefore readily be adapted to different types and sizes of sausages, regardless of the appearance of the skin at the end of the sausage. Furthermore, the outside of the skin and any matter which has been in contact with it may not come into contact with the skinned sausage.

SOLUTION

The objects forming the basis of the present invention will be attained in respect of the method if this is characterized in that the gripping means grasp the skin in diametrically opposed positions, and that the knife cuts the skin in the longitudinal direction of the sausage.

The objects forming the basis of the present invention will be attained in respect of the apparatus if this is characterized in that the gripping means are disposed on either side of the sausage, and that the knife is disposed below the sausage.

Further advantages will be attained according to the present invention if the method is given one or more of the characterizing features as set forth in appended subclaims 2 to 4 and if the apparatus is given one or more of the characterizing features as set forth in appended subclaims 6 to 9.

BRIEF DESCRIPTION OF THE ACCOMPANYING DRAWINGS

The present invention will now be described in greater detail hereinbelow, with particular reference to the accompanying Drawings. In the accompanying Drawings:

FIG. 6 is a perspective view corresponding to that of FIG. 5 during a final phase of the work cycle.

DESCRIPTION OF PREFERRED EMBODIMENT

Figure 5:
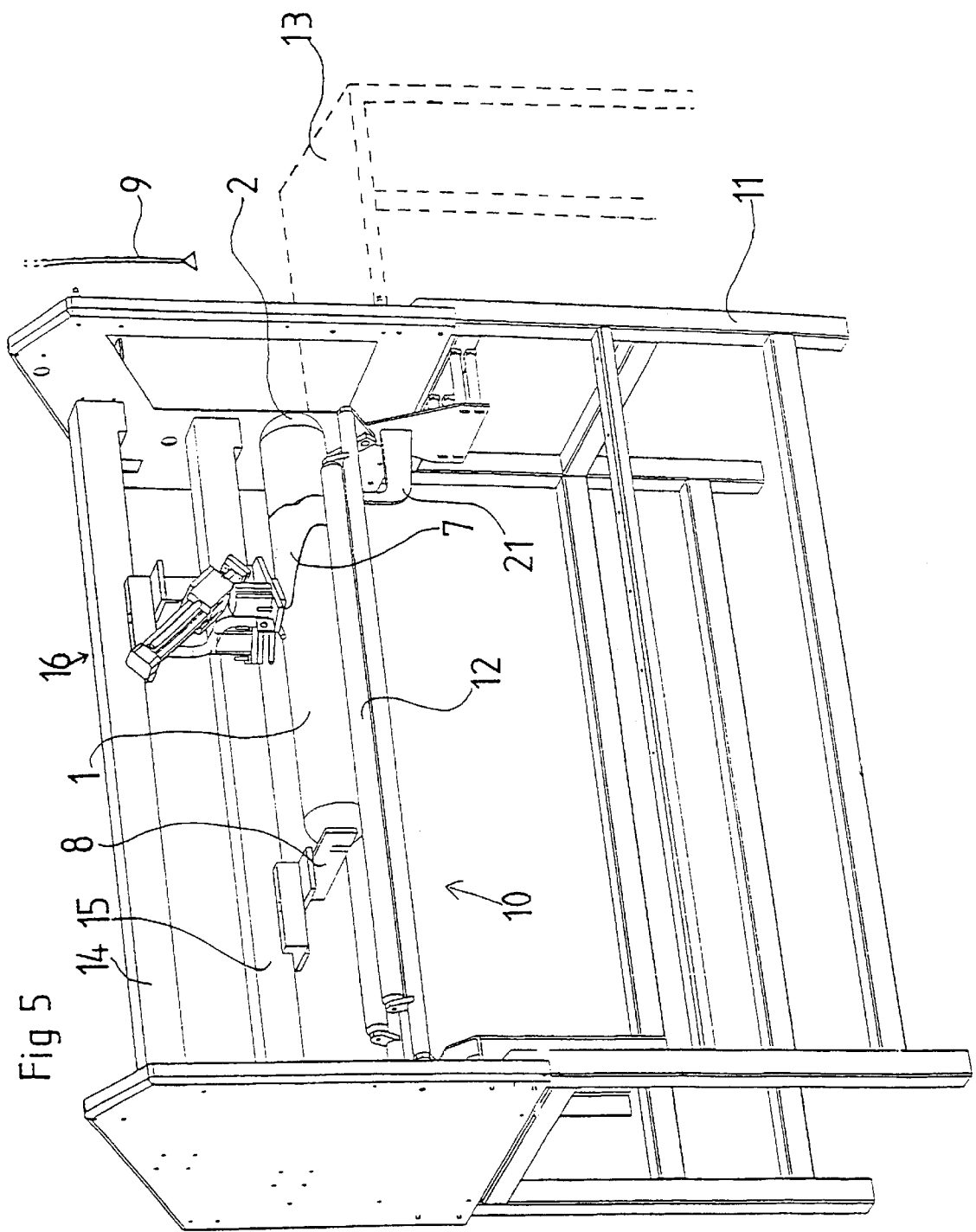
FIG. 5 is a perspective view a further distance along the work cycle.

The present invention relates to a machine according to FIG. 5. The machine has a legged frame 11 with preferably four legs. Further, there is provided a support arrangement 10 on which the sausage 1 is intended to rest. The support arrangement 10 is adjustable for different sausage sizes and, in the present embodiment, consists of quite slim cylinders 12 in relation to the thickness of the sausage 1. The cylinders 12 are disposed on a system of rocker arms 22 which are pivotally disposed in the machine in the pivot 23 and a corresponding pivot at the other end of the machine. The distance between the cylinders 12 may be adapted to the thickness of the sausage 1. The position of the cylinders 12 also determines the position sausage 1 in the vertical direction.

A knife 6 on a knife holder 21 is disposed between the cylinders 12.

Ahead of the machine, there is disposed a feeder device which is not shown in the Figure. The sausage 1 is intended to be fed to the machine transversely of its own and the cylinders' 12 longitudinal direction, so that it will rest above the cylinders 12 with substantially the same longitudinal direction. During one work cycle, the sausage 1 is fed to the right in the Figure along the cylinders 12 until the entire sausage 1 is located on a discharge table 13 which is shown by broken lines in the Figure.

Above the sausage 1 and the support arrangement 10, there are two linear guides 14, 15 which are longitudinal. A displacement device 8 and a unit 16 provided with gripping means and abutment means, respectively, are movably disposed on the guides 14 and 15. In addition, each one of the linear guides 14 and 15 is provided with a drive means for displacing the units disposed on the guides. The displacement device 8 and the unit 16 provided with gripping means 3 are movable independently of each other and may pass one another without hindrance. For example, the drive means may consist of chains, belts, compressed air or the like, but the drive means are not shown in the Figures.

Figure 1:
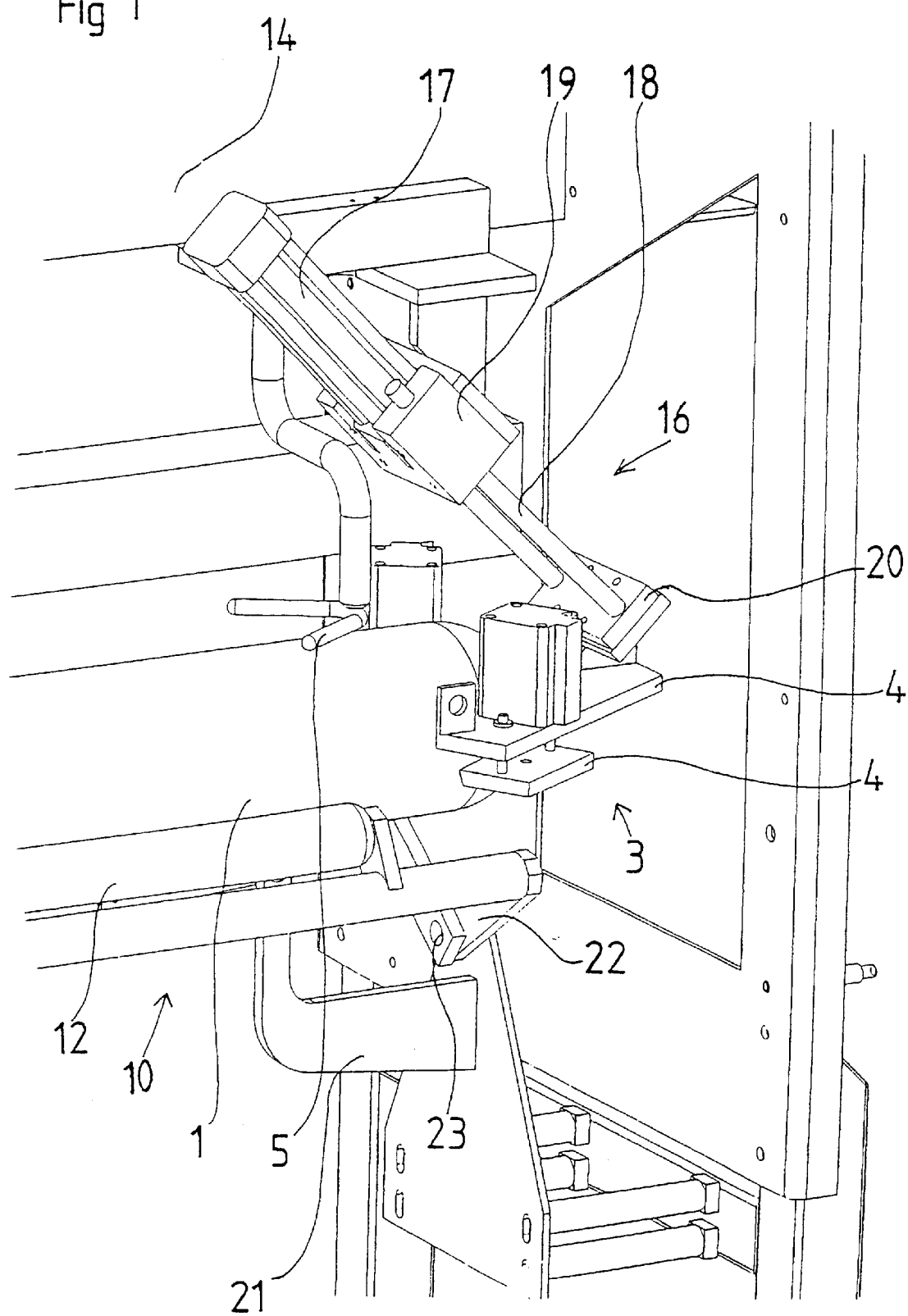
FIG. 1 is a perspective view of the present invention before the gripping means have grasped the sausage skin.

FIG. 1 shows in perspective the apparatus for removing the skin from a sausage in the beginning of a work cycle. The sausage 1 has, with the aid of the displacement device 8 (shown in FIG. 5), been advanced along a support arrangement 10 which, in the Figure, is shown as cylinders, but which could just as well be other types of rails of low friction since the sausage is not intended to rotate during the work cycle. On both sides of the end portion 2 of the sausage, the gripping means are in their respective starting positions. Each one of the gripping means 3 consists of two mutually reciprocal plates 4.

The plates 4 are substantially horizontal and approximately parallel with each other. The gripping means 3 on each respective side of the sausage lie substantially in the same plane. In the initial phase, they assume a position flush with the center of the sausage. The edges of the plates 4 are quite blunt in order not to cut open the skin 7, and for the greater part abut against the sausage 1 when this is advanced towards the gripping means 3. In principle, the edges are approximately tangential to the rounded end portion 2 of the sausage 1. Seen from above, the edges of the plates 4 make an angle with the longitudinal direction of the sausage 1. In the preferred embodiment, this angle is of the order of magnitude of about 30–60°.

In the Figure, the sausage 1 has been advanced so far by the displacement device 8 that it firmly abuts against, or is urged against the gripping means 3.

Figure 2:
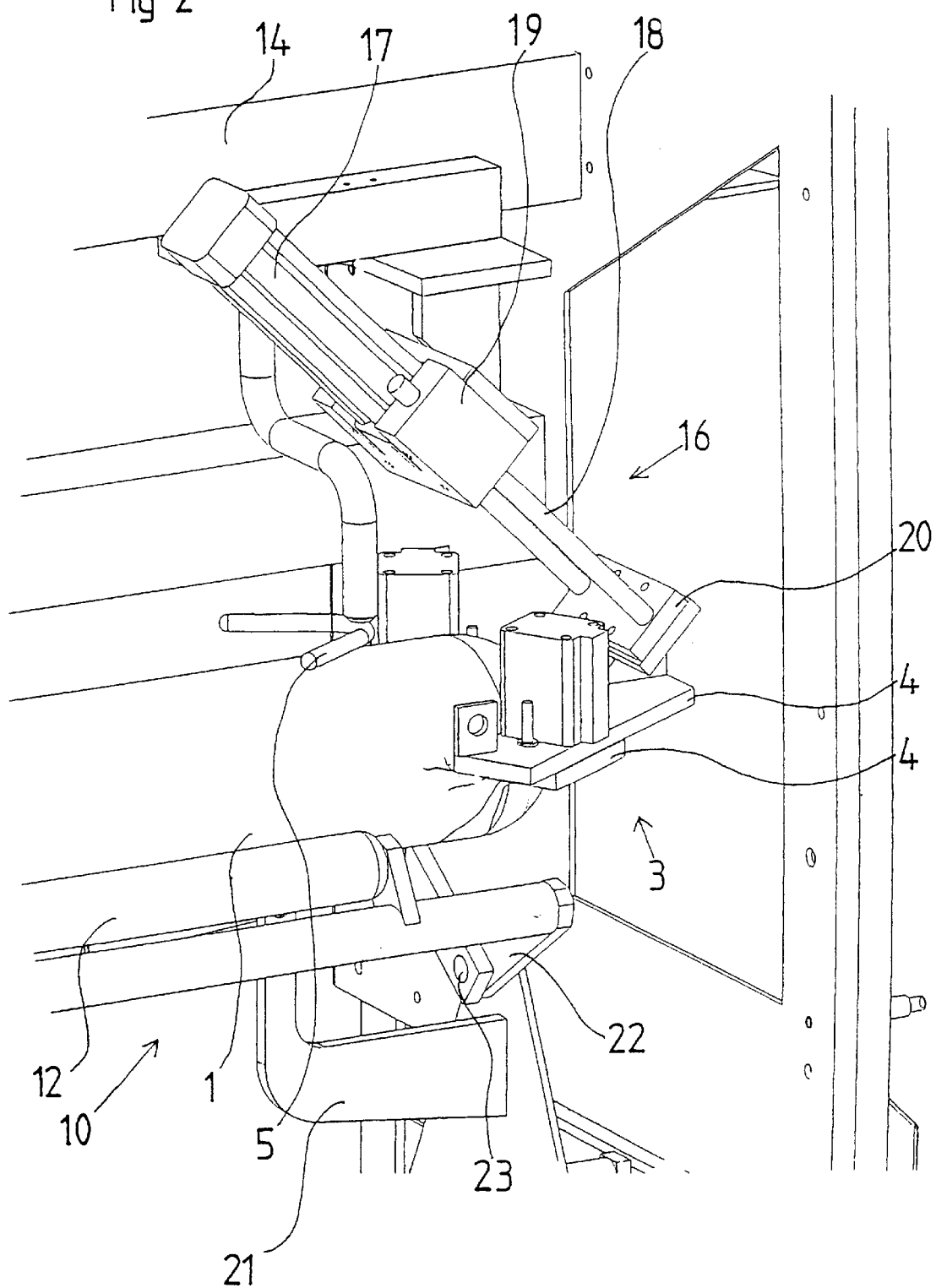
FIG. 2 is a perspective view of the apparatus according to the present invention at a later stage in the work cycle.

In FIG. 2, the plates 4 in the gripping means 3 have been moved towards one another and the skin 7 has been clamped between the plates 4 in the gripping means 3.

Figure 3:
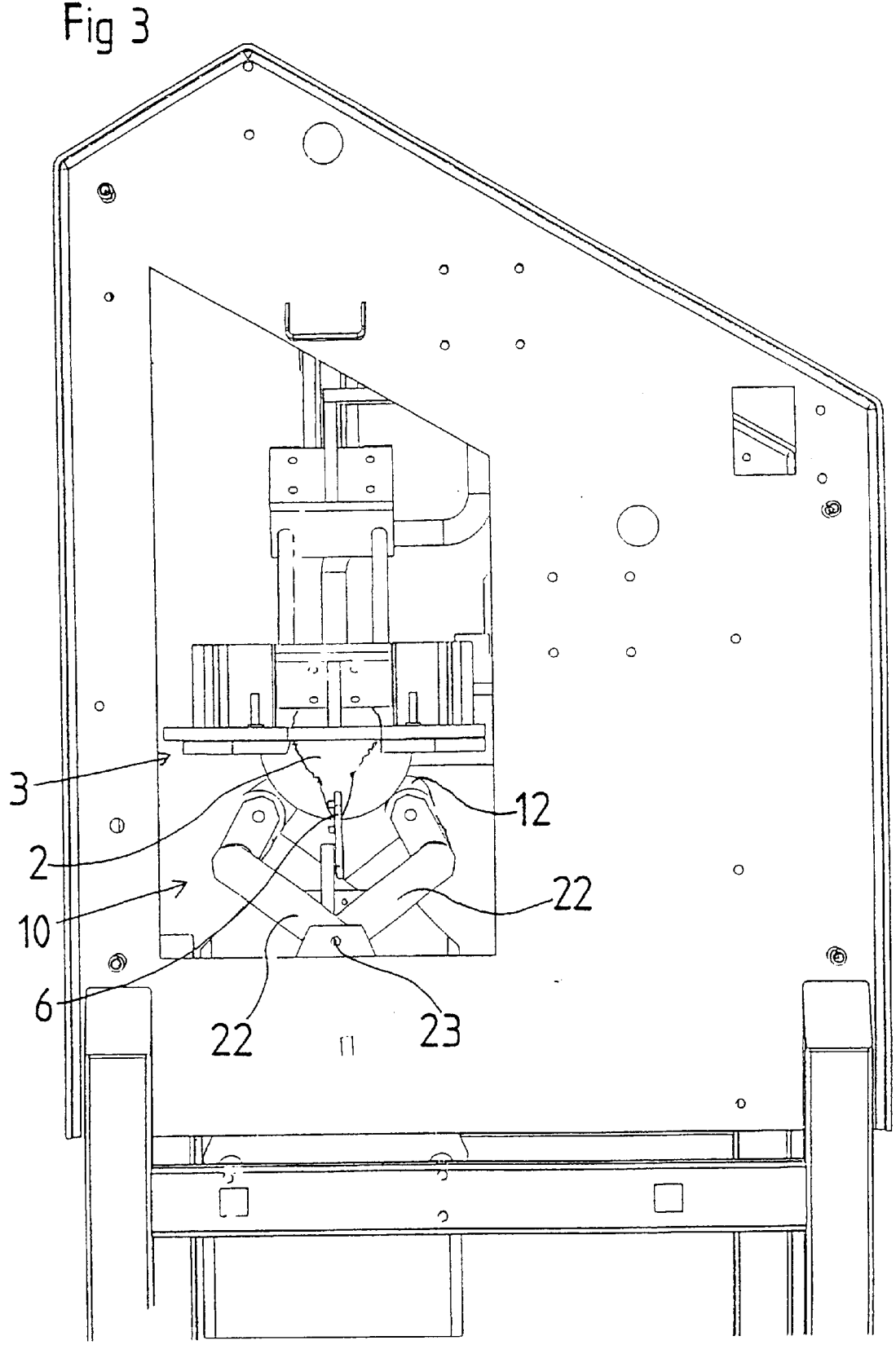
FIG. 3 is a straight front elevation of the apparatus according to the present invention, it being shown how the knife cuts the sausage skin.

At the same time (as shown in FIG. 3), the knife 6 has begun to cut up the skin 7 on the underside of the sausage 1. The knife 6 is disposed between the cylinders 12 included in the support arrangement 10. The knife 6 is pivotally disposed in order for it to be able to cut an incision both in the end portion 2, which is cupped, and along the underside of the sausage 1. For the pressure of the knife edge against the sausage 1 to be sufficient to cause the skin 7 to rupture but not to damage the rest of the sausage 1 to any appreciable degree, the knife 6 is biased upwards, either by a weight or by spring force.

Figure 4:
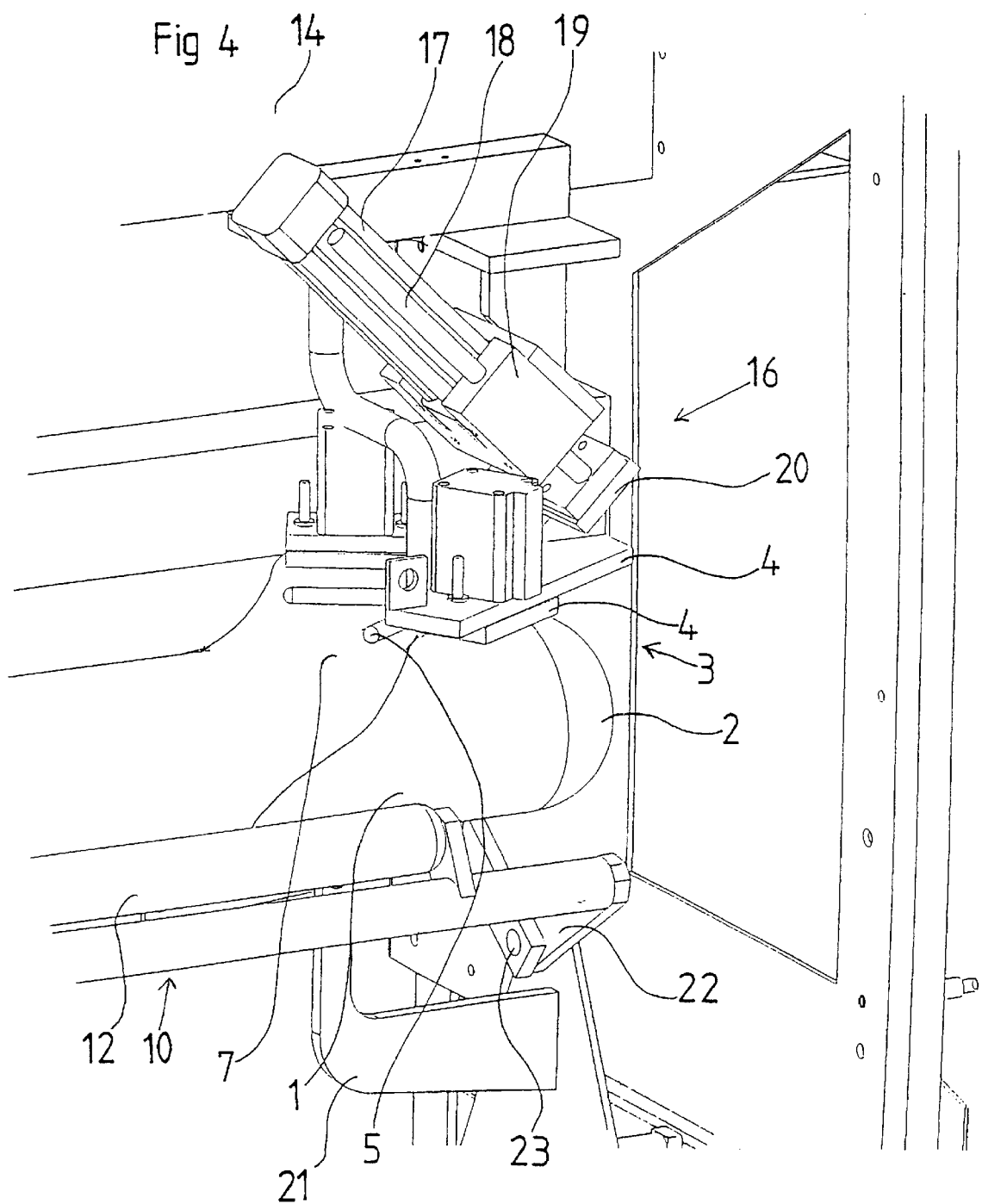
FIG. 4 is a perspective view corresponding to that of FIGS. 1 and 2 in a later stage of the work cycle.

In FIG. 4, the gripping means 3 have been raised up a distance to a position above the sausage 1i under the action of a piston and cylinder assembly 17 which, by means of guide rods 18 in slide blocks 19, actuate a carrier 20 on which the gripping means 3 are disposed. Since the piston and cylinder assembly 17 is obliquely inclined, the skin 7 will, already when the gripping means 3 are raised, be pulled loose from the sausage 1. The direction of movement is at approximately 40–70° to the vertical, so that the gripping means 3 move in over the sausage 1 away from its end portion 2. When the gripping means 3 have reached their upper position, the sausage 1 may freely pass under them. It is clearly visible in the Figure how a portion of the sausage 1 has been freed of its skin 7.

Since the loosened portion of the skin 7 extends between the sausage 1 and the gripping means 3, which are located above the sausage 1, the sausage 1 has a tendency to move upwards. In order to counteract this movement, an abutment member 5 is disposed above the sausage 1 approximately flush with the gripping means 3 on the unit 16 provided with the gripping means 3. In the preferred embodiment, the abutment member 5 substantially has the form of a V and is disposed in a plane which is approximately parallel to the plane of the gripping means 3.

FIG. 5 shows how the unit 16 with the gripping means 3 and abutment member 5 has moved a distance along the sausage along the upper linear guide 14. At the same time, the displacement device 8 has moved in the opposite direction along the lower linear guide 15 and shunted the sausage 1 ahead of it in its longitudinal direction.

In FIG. 6, the unit with gripping means and abutment member has passed the sausage 1 and the displacement device 8. In order to retain the sausage 1 in its position when the last portion of the skin 7 is pulled loose, a retainer device 9 is provided for holding the sausage in its front portion. The retainer device 9 exercises a light pressure on the sausage 1 and holds it in place against the discharge table 13.

Throughout the entire process when the skin 7 is pulled off, it should be noted that the outside of the skin 7 does not come into contact with the skinned sausage 1. Nor does any matter which has been in contact with the outside of the skin come into contact with the sausage 1. As a result, the shelf life of the product is increased substantially.

When the entire skin casing 7 has been pulled off from the sausage 1, the gripping means 3 will release the grip on the skin 7 and this is allowed to fall off, preferably between the cylinders 12 or rails included in the support arrangement 10. Thereafter, the unit with the gripping means 3 and the abutment member 5 and the displacement device 8, respectively, reassumes its original starting position and a new sausage 1 may be processed.

DESCRIPTION OF ALTERNATIVE EMBODIMENTS

For the preferred embodiment in the foregoing, directions were given, for example 'upwards', 'downwards', 'to the side', and positions such as, for example, 'above', 'below', in order to describe the method and the apparatus for removing the skin from a sausage. In the description, reference has been made to the accompanying Drawings, and the orientation of the parts included in the apparatus as shown in the Drawings.

It is naturally possible to move the included components in relation to that described above without, to this end, deviating from the inventive concept as herein disclosed.

Principally, this may be put into effect in that the components included in the apparatus are rotated through up to 180° around the longitudinal axis of the sausage. In this embodiment, the knife 6 should be spring-biased if biasing by means of a weight were to prove insufficient or impossible because of the orientation of the knife 6.

In particular, the knife 6, the gripping means 3 and the abutment member 5 may be rotated about 90° around the longitudinal axis of the sausage. In this case, accessibility may be improved and the infeed of the sausage may possibly be facilitated.

Further, it has been described how the knife 6 cuts the skin 7 along the entire length of the sausage 1. One alternative could be a shorter incision which functions as a tear indication on the further removal of the skin 7. By way of suggestion, the incision may be placed in the longitudinal direction of the sausage 1 but only in the rounded end portion 2 of the sausage 1, so as to terminate in the region where the sausage is of uniform thickness.

The present invention may be modified without departing from the scope of the appended Claims.

What is claimed is:

1. A method for removing the skin (7) from a sausage (1), comprising the step that an end portion (2) of the sausage is cut off, that the skin (7) is grasped by gripping means (3), that an incision is made in the sausage by a knife (6), that the gripping means (3) and the sausage (1) undergo a relative displacement in the longitudinal direction of the sausage (1), and that the skin (7) is pulled off in the longitudinal direction, characterized in that the gripping means (3) grasps the skin (7) in diametrically opposed positions, the knife (6) cuts the skin (7) in the longitudinal direction of the sausage (1), said gripping means (3) are moved a distance transversely of the longitudinal direction of the sausage once the gripping means have grasped the skin (7), and an abutment member (5) prevents the sausage (1) from moving with the gripping means when said gripping means are displaced, for which reason the skin (7) is pulled off.

2. The method as claimed in claim 1, characterized in that the sausage (1) is urged by a retainer device (9) against an abutment when the last portion of the skin (7) is pulled of.

3. An apparatus for removing the skin (7) from a sausage (1) comprising a substrate for support, gripping means (3), a knife (6) and a displacement device (8), characterized in that said gripping means (3) are disposed for contact on opposing sides of the sausage (1), and that the knife (6) is disposed at a surface of the sausage (1) between said gripping means, wherein said displacement device is designed to have the gripping means and sausage undergo a relative displacement in a longitudinal extension direction of the sausage.

4. The apparatus as claimed in claim 3, characterized in that said gripping means (3) are disposed to move, in substantially parallel fashion, a distance away from the sausage (1) and the knife (6) after engagement with the sausage skin (7).

5. The apparatus as claimed in claim 3, characterized in that an abutment member (5) is disposed behind said gripping means (3) relative to a direction of movement of the sausage (1) for preventing movement of the sausage in a direction away from the knife.

6. The apparatus as claimed in claim 3, characterized in that the knife (6) is movably disposed towards and away from the sausage.

7. The apparatus as claimed in claim 3, characterized in that a retainer device (9) is provided for retaining the sausage (1) in its position when the last portion of the skin (7) is pulled off.

8. The apparatus as claimed in claim 4, characterized in that an abutment member (5) is disposed behind said gripping means (3) relative to a direction of movement of the sausage (1) for preventing a movement of the sausage in a direction away from the knife.

9. The apparatus as claimed in claim 4, characterized in that the knife (6) is movably disposed towards and away from the sausage.

10. The apparatus as claimed in claim 5, characterized in that the knife (6) is movably disposed towards and away from the sausage.

11. The apparatus as claimed in claim 4, characterized in that a retainer device (9) is provided for retaining the sausage (1) in its position when the last portion of the skin (7) is pulled off.

12. The apparatus as claimed in claim 5, characterized in that a retainer device (9) is provided for retaining the sausage (1) in its position when the last portion of the skin (7) is pulled off.

13. The apparatus as claimed in claim 6, characterized in that a retainer device (9) is provided for retaining the sausage (1) in its position when the last portion of the skin (7) is pulled off.

14. The apparatus of claim 3, wherein said substrate includes guide surfaces for guiding longitudinal movement of both said gripping means and displacement device in opposite longitudinal directions.

15. The apparatus of claim 3 wherein said displacement device is a single contact device positioned for sausage end contact.

16. A method for removing the skin (7) from a sausage (1), comprising the steps of cutting an end portion (2) of the sausage, grasping the skin (7) with gripping means (3), forming an incision in the sausage by a knife (6), subjecting the gripping means (3) and the sausage (1) to a relative displacement in the longitudinal direction of the sausage (1), and pulling of skin (7) off in the longitudinal direction, and, in the step of grasping the skin, the gripping means (3) grasps the skin (7) in diametrically opposed positions, and in the step of cutting the knife (6), the knife cuts the skin (7) in the longitudinal direction of the sausage (1), wherein said gripping means (3) are moved a distance transversely of the longitudinal direction of the sausage once the gripping means have grasped the skin (7), and an abutment member (5) prevents the sausage (1) from moving with the gripping means when the gripping means are displaced, for which reason the skin (7) is pulled off.

17. An apparatus for removing skin from a sausage, comprising:

a support substrate extending in a longitudinal direction and dimensioned to receive and support a sausage;

a first gripper positioned to a first side of the sausage when supported on said support substrate, said first gripper having a first side skin gripper assembly which shifts said first gripper between a skin gripping mode and a skin release mode;

a second gripper positioned to a second side of the sausage, which second side opposes said first side of the sausage, when supported on said support substrate, said second gripper having a second side skin gripper assembly which shifts said second gripper between a skin gripping mode and a skin release mode;

a sausage displacement device;

a knife arranged for sausage skin contact when the sausage is supported on said support substrate, said knife being positioned at a location between the first and second sides of the sausage; and a gripper adjustment device which positionally adjusts said first and second grippers toward and away from the sausage and in a direction transverse to the longitudinal direction;

said support substrate further comprising longitudinal guide support surfaces for guiding longitudinal movement of said sausage displacement device and said first and second grippers, and said sausage displacement device and said first and second grippers being arranged on said guide support surfaces for opposite relative longitudinal direction movement along said guide support surfaces such that during displacement of the sausage by said sausage displacement device in a first longitudinal direction said first and second grippers move in an opposite, second longitudinal direction while skin is removed from the sausage.

18. The apparatus of claim 17 wherein said first side and second side skin gripper assemblies each comprise a pair of plates and means for moving said plates into a clamping relationship relative to the skin.

19. The apparatus of claim 17 wherein said gripper adjustment device includes an obliquely oriented movement track relative to the longitudinal direction for providing both transverse component and longitudinal component movement is said first and second grippers.

20. The apparatus of claim 17 further comprising an abutment member which limits a degree of movement of the sausage in the transverse direction during grippers adjustment by said gripper adjustment mechanism away from the sausage.

21. The apparatus of claim 17 wherein
said knife is disposed to form a longitudinal incision over at least a portion of the skin of the sausage during displacement of the sausage by said displacement device.

22. The apparatus of claim 21 wherein said displacement device is positioned for contact with a first end of the sausage, and said knife and first and second grippers are positioned for initial contact at an opposite end of the sausage.

23. An apparatus for removing the skin (7) from a sausage (1) comprising a substrate for support, gripping means (3), a knife (6) and a displacement device (8), characterized in that said gripping means (3) are disposed for contact on opposing sides of the sausage (1), and that the knife (6) is disposed at a surface of the sausage (1) between said gripping means, wherein said gripping means are disposed for skin pinching contact on diametrically opposing sides of the sausage.

24. The apparatus as recited in claim 23 wherein said knife is positioned at an intermediate location between said diametrically opposed sides of the sausage.

* * * * *